W. M. COFFMAN.
BRUSH SUPPORT FOR DYNAMO ELECTRIC MACHINES.
APPLICATION FILED OCT. 9, 1906.
917,005.
Patented Apr. 6, 1909.
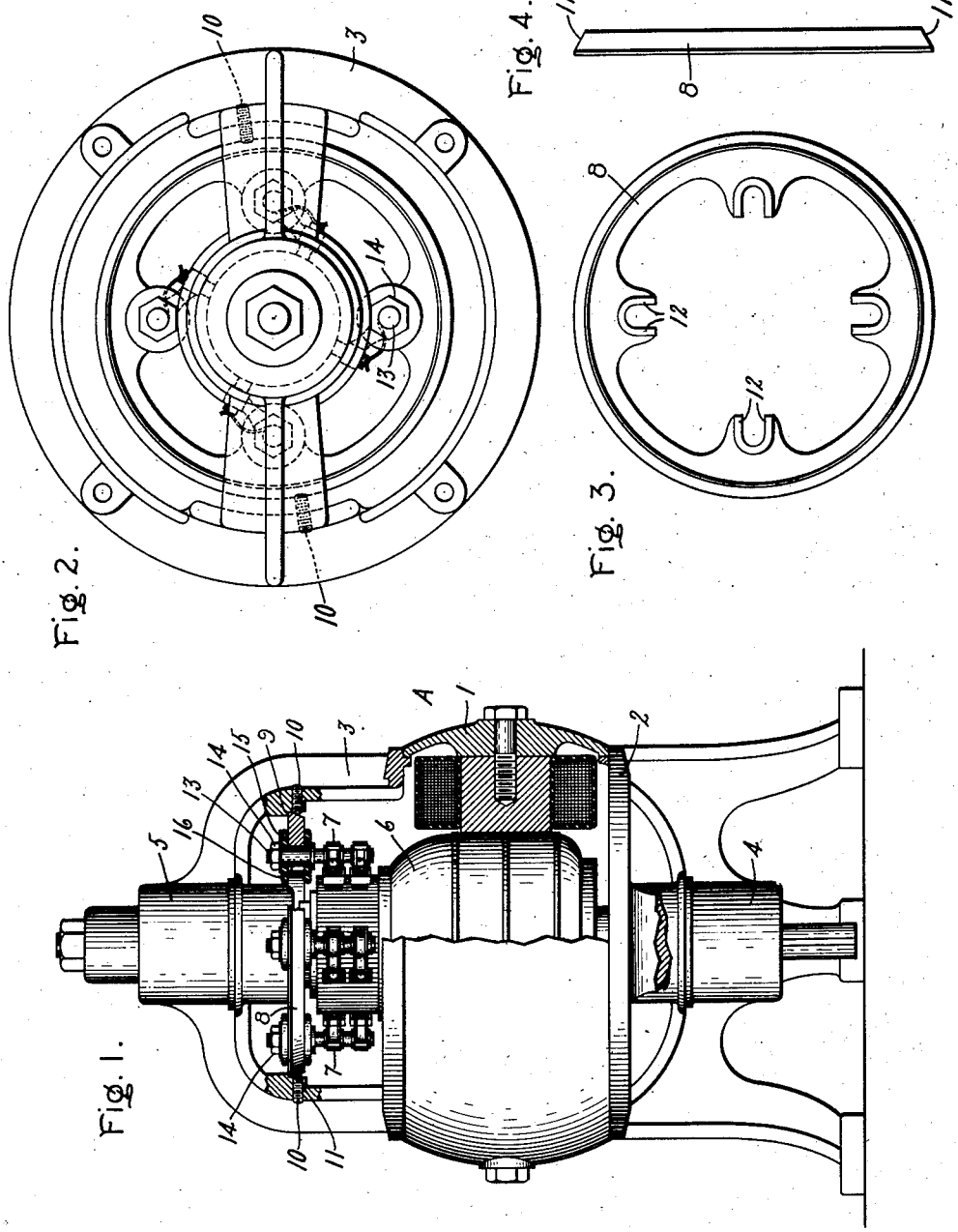
Witnesses:
George W. Tilden.
J. Ellis Glen.
Inventor:
Walter M. Coffman,
by Albert G. Davis
Att'y.

UNITED STATES PATENT OFFICE.

WALTER M. COFFMAN, OF MADISON, WISCONSIN, ASSIGNOR TO NORTHERN ELECTRICAL MANUFACTURING COMPANY, A CORPORATION OF WISCONSIN.

BRUSH-SUPPORT FOR DYNAMO-ELECTRIC MACHINES.

No. 917,005.      Specification of Letters Patent.      Patented April 6, 1909.

Application filed October 9, 1906. Serial No. 338,113.

*To all whom it may concern:*

Be it known that I, WALTER M. COFFMAN, a citizen of the United States, residing at Madison, county of Dane, State of Wisconsin, have invented certain new and useful Improvements in Brush-Supports for Dynamo-Electric Machines, of which the following is a specification.

My invention relates to dynamo-electric machines and more particularly to means for supporting the brushes thereof, and has for its object to provide a cheap, simple and compact arrangement whereby the brushes may be effectively supported in operative relation to the commutator or other current-collecting device.

To the above end my invention comprises the novel features of construction to be hereinafter particularly pointed out in the claims. For a complete understanding of my invention, however, and of its various objects and advantages, reference may be had to the following detailed description taken in connection with the accompanying drawing, wherein—

Figure 1 shows partly in side elevation and partly in cross-section a machine equipped with brush-holder devices arranged in accordance with one form of my invention; Fig. 2 is a plan view of the machine shown in Fig. 1; and Figs. 3 and 4 are, respectively, side and end elevations of the brush-holder ring or yoke.

Referring to the drawing, A represents a motor having a field-magnet ring 1 to which are attached the head 2 and the head or bonnet 3; the members 2 and 3 being provided with bearings 4 and 5, respectively, for receiving the shaft of the armature 6. These parts may take any usual or preferred forms since they in themselves form no part of the present invention.

7 are brush-holders of any suitable construction, and in accordance with the present invention these brush-holders are supported from an annular ring 8 which is concentric with the armature shaft and is supported from its outer edge by the bonnet 3. The connection between the ring and the bonnet consists preferably of a shoulder or shoulders 9 located on the interior of the bonnet, together with means such as screws 10 for holding the ring against the shoulder or shoulders. In order that the ring may be conveniently and accurately adjusted and be held rigidly in place, I prefer to bevel the outer edge thereof, as at 11, and to so arrange the screws that they bear upon the bevel surfaces; whereby, when the screws are tightened, the ring is firmly wedged in place. By this arrangement accurate machining of the parts is unnecessary, since small irregularities are compensated for by the wedging connection. The brushes may be adjusted into any desired position circumferentially of the commutator by simply loosening the screws and turning the ring. The brushes may be carried from the supporting ring in any suitable way, preferably by providing the ring with inwardly-projecting open-ended jaws 12, and securing the brush-holder studs 13 therein by means of nuts 14. In this arrangement the brush-holders and studs may be readily adjusted toward and from the commutator by simply loosening the nuts which hold them in place and moving them radially. It will furthermore be seen that the brush-holders may be effectively insulated from each other, since substantial washers 15 and sleeves 16 may be placed between the ring and the brush-holder studs even in very small machines.

While I have described in detail the best form of my invention now known to me, I do not desire to limit my invention to this particular form, since in its broader aspects it may be embodied in various other forms as will be evident from the definitions thereof in the appended claims.

What I claim as new and desire to secure by Letters Patent of the United States, is,—

1. In a dynamo-electric machine, a bonnet at one end thereof, a brush-supporting ring having a beveled outer edge, a shoulder in said bonnet against which the outer portion of the ring bears, and a screw carried by said bonnet and engaging said beveled edge of the ring for forcing it against the shoulder.

2. In a dynamo-electric machine, a bonnet at one end thereof, said bonnet having a bearing for the armature shaft and a shoulder on its interior periphery, a brush-supporting ring arranged within said bonnet in engagement with said shoulder and with its center on the axis of the said bearing, said ring having a beveled outer edge, and a screw arranged on the bonnet in position to engage the beveled edge of the ring and force the ring against said shoulder.

3. In a dynamo-electric machine, a bonnet at one end thereof having a bearing for the armature shaft, a brush supporting ring concentric with said bearing and having a beveled outer edge, a shoulder in said bonnet against which the outer portion of the ring bears, and means arranged on said bonnet to engage the beveled edge of said ring and thereby force said ring against said shoulder.

4. In a dynamo-electric machine, a bonnet at one end thereof, a brush-supporting ring having a beveled outer edge, a shoulder in said bonnet against which the outer portion of the ring bears, a screw carried by said bonnet and engaging said beveled edge of the ring for forcing it against the shoulder, said ring having internal radially-extending jaws, and brush-holders secured in said jaws.

In witness whereof, I have hereunto set my hand this 4th day of October, 1906.

WALTER M. COFFMAN.

Witnesses:
JOHN P. MALLETT,
FRANK E. FISHER.